United States Patent
Arnold

(10) Patent No.: US 8,286,231 B2
(45) Date of Patent: Oct. 9, 2012

(54) SYSTEM AND METHOD FOR INFORMATION SHARING BETWEEN NON-SECURE DEVICES

(75) Inventor: Steven L. Arnold, Seattle, WA (US)

(73) Assignee: The Boeing Company, Chicago, IL (US)

( * ) Notice: Subject to any disclaimer, the term of this patent is extended or adjusted under 35 U.S.C. 154(b) by 721 days.

(21) Appl. No.: 12/322,008

(22) Filed: Jan. 28, 2009

(65) Prior Publication Data

US 2010/0192217 A1 Jul. 29, 2010

(51) Int. Cl.
*G06F 21/00* (2006.01)

(52) U.S. Cl. .......... 726/13; 713/166; 709/223; 709/225; 709/229; 370/401

(58) Field of Classification Search .............. 726/13
See application file for complete search history.

(56) References Cited

U.S. PATENT DOCUMENTS 5,768,162 A * 6/1998 Rupp et al. ............ 702/186
2006/0143449 A1 * 6/2006 Groger et al. ............ 713/166

OTHER PUBLICATIONS

Commercial Cross-Domain XML Guard| http://www.dtic.mil/cgi-bin/GetTRDoc?AD=ADA442041|Air Force Research Laboratoary| Nov. 2005.*

* cited by examiner

*Primary Examiner* — Thanhnga B Truong
*Assistant Examiner* — Mahfuzur Rahman
(74) *Attorney, Agent, or Firm* — Harness, Dickey & Pierce, P.L.C.

(57) ABSTRACT

A method for communicating information packets from a first host system operating in a first security domain and in accordance with a non-secure communications protocol, using a dataguard, to a second host system operating in a second security domain different than the first security domain, and where the second host system is also operating in accordance with the non-secure communications protocol. The method may involve: using a first driver operating with the dataguard to interface the dataguard with the first host system; using a first proxy task group operating with the dataguard to interface the dataguard to the first driver and to communicate with the first driver in accordance with a protocol of the first security domain; using a second driver operating with the dataguard to interface the dataguard to the second host system; and using a second proxy task group operating with the dataguard to interface the dataguard to the second proxy task group and to communicate with the second driver in accordance with a protocol of the second security domain.

13 Claims, 7 Drawing Sheets

SYSTEM AND METHOD FOR INFORMATION SHARING BETWEEN NON-SECURE DEVICES

STATEMENT OF GOVERNMENT RIGHTS

The present disclosure was developed at least in part with Government support under F19628-02-C-0048 awarded by the Air Force. The government has certain rights in the present disclosure.

FIELD

The present disclosure relates to information exchange systems, and more particularly to an information exchange system and method that is adapted to exchange information between two legacy systems operating in different security domains, in a secure and reliable manner.

BACKGROUND

The statements in this section merely provide background information related to the present disclosure and may not constitute prior art.

Simple, automated and trusted information sharing between legacy system users and/or devices, for example systems operating in accordance with the Mil-Std-1553 protocol, and operating in different security domains (i.e. top secret to unclassified) has been difficult to achieve. Any information sharing solution should ideally provide a high degree of trust that only the appropriate data is allowed to pass, either upgrade or downgrade, between the security domains to be usable. By "upgrade" it is meant from a lower level security domain to a higher level security domain, and by "downgrade" it is meant from a higher level security domain to a lower level security domain.

With legacy systems operating in accordance with the Mil-Std-1553 protocol, it has not been possible to provide the high level of assurance between users that is desired when data is being moved between users and/or devices operating in different classification domains. Furthermore, existing high assurance solutions are not applicable to legacy systems.

SUMMARY

In one aspect the present disclosure relates to a method for communicating information packets from a first host system operating in a first security domain and in accordance with a non-secure communications protocol, using a dataguard, to a second host system operating in a second security domain different than the first security domain, and where the second host system is also operating in accordance with said non-secure communications protocol. The method may comprise: using a first driver operating with the dataguard to interface the dataguard with the first host system; using a first proxy task group operating with the dataguard to interface the dataguard to the first driver and to communicate with the first driver in accordance with a protocol of the first security domain; using a second driver operating with the dataguard to interface the dataguard to the second host system; and using a second proxy task group operating with the dataguard to interface the dataguard to the second proxy task group and to communicate with the second driver in accordance with a protocol of the second security domain.

In another aspect the present disclosure relates to a method for communicating information packets from a first host system operating in a first security domain and in accordance with a non-secure communications protocol, using a dataguard, to a second host system operating in a second security domain different than the first security domain, and where the second host system is also operating in accordance with said non-secure communications protocol. The method may comprise: transferring an information packet from the first host system to a first proxy task group of the dataguard using a first driver interfaced to the first proxy task group, where the first driver operates in accordance with the non-secure communications protocol; using the dataguard to create a filter that binds to the first proxy task group to receive and filter all subsequently received information packets from the first host system, to generate filtered information packets; binding the filter to a second proxy task group, with the second proxy task group being interfaced to a second driver that operates in the non-secure communications protocol; and using the second proxy task group to communicate the filtered information packets to the second host via said second driver.

In another aspect the present disclosure relates to a method for communicating information packets from a first host system operating in a first security domain and in accordance with a non-secure communications protocol, using a dataguard, to a second host system operating in a second security domain different than the first security domain, and where the second host system is also operating in accordance with the non-secure communications protocol. The method may comprise: transferring an information packet from the first host system to a first proxy task group of the dataguard using a first driver operating in the first security domain, and in accordance with the non-secure communications protocol; using the first proxy task group to assign a name to the information packet when the information packet is received by the dataguard, to store the received information packet in a file, and to use a file name associated with the received information packet to identify all further received information packets having the file name; creating a filter for the file name, the filter operating to filter information contained in information packets subsequently transmitted from the first host system that have a name that matches the filter name created by the filter; binding the filter with the first and second proxy task groups so that the filter receives all subsequently transmitted information packets from the first host system that have the file name, and is able to communicate with the second proxy task group; using the filter to receive the stored information packet and to filter the stored information packet to create a filtered information packet in accordance the non-secure communications protocol; using the filter to store the filtered information packet in the file system; using the filter to assign a new file name to the filtered information packet and to transmit the new file name to the second proxy task group; using the second proxy task group to obtain the filtered information from packet from the file system; and using the second proxy task group to communicate the filtered information packet to a second driver operating in accordance with the non-secure communications protocol.

In still another aspect the present disclosure relates to a system for communicating information packets from a first host system operating in a first security domain and in accordance with a non-secure communications protocol, to a second host system operating in a second security domain that is different from the first security domain. The system may comprise: a dataguard; a first driver included to form a portion of the dataguard, and forming an interface between said dataguard and the first host system, the first driver configured to operate in accordance with the non-secure communications protocol; a second driver forming an interface between the dataguard and the second host system, the second driver also configured to operate in accordance with the non-secure communications protocol; the dataguard including proxy task groups that further assist in interfacing the first and second host systems to the dataguard; and the dataguard including a filter that binds to said proxy task groups and is adapted to filter received information packets from the first host system having a given packet name, and to generate filtered information packets identified by corresponding new packet names, and adapted to forward the filtered information packets and the corresponding new packet names to the second driver via one of the proxy task groups for subsequent transmission to the second host system in accordance with the non-secure communications protocol.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION

Figure 1:
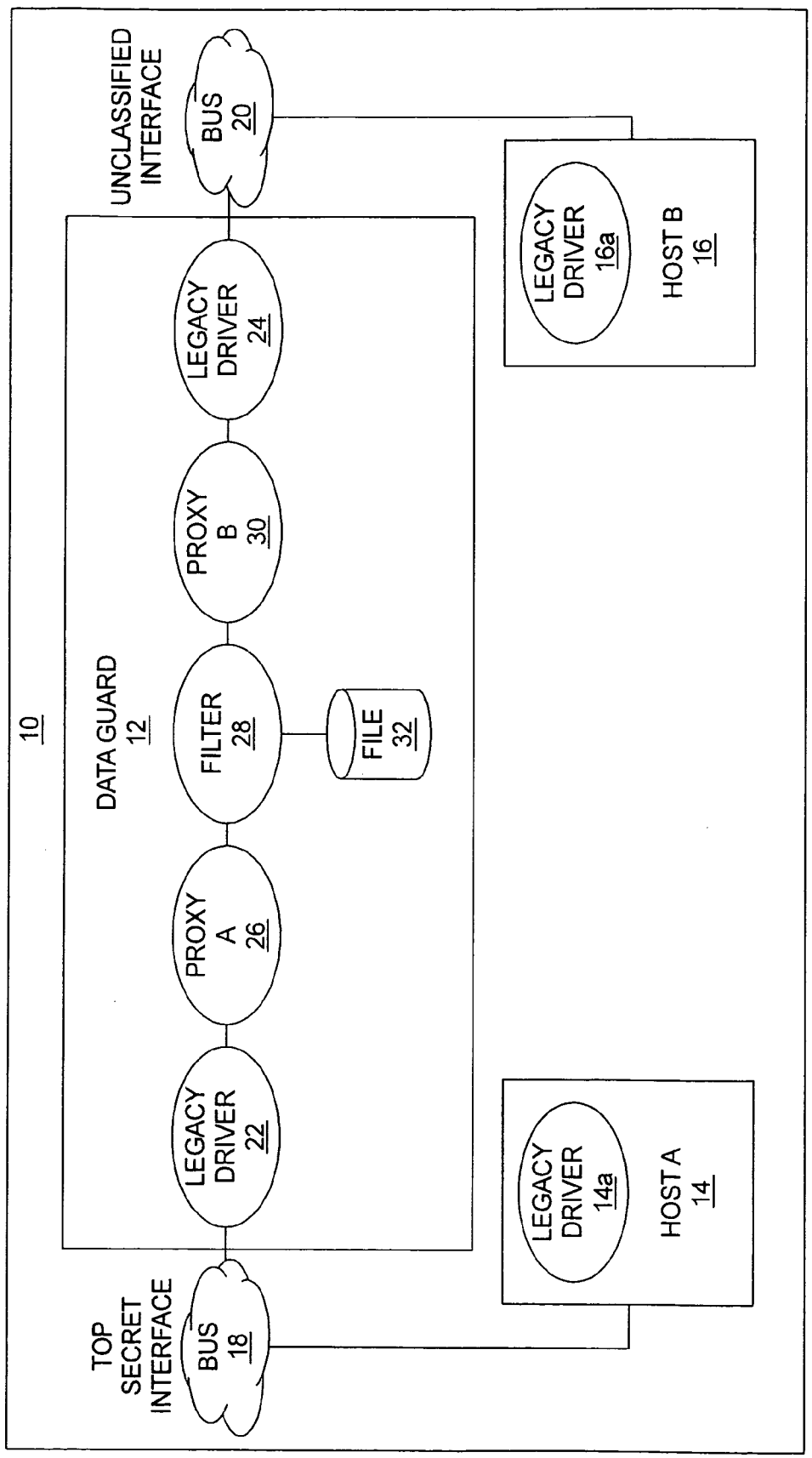
FIG. 1 is a block diagram of one exemplary implementation of a system in accordance with the present disclosure.

The following description is merely exemplary in nature and is not intended to limit the present disclosure, application, or uses. It should be understood that throughout the drawings, corresponding reference numerals indicate like or corresponding parts and features.

Referring to FIG. 1 there is a system 10 in accordance with one embodiment of the present disclosure for communicating information over a filtering Data Guard 12 between a non-secure first host system 14 and a non-secure second host system 16. The first host system 14 has a legacy communication driver 14a, in this example a conventional Mil-Std-1553 bus controller, while the second host system 16 similarly has a legacy communication driver 16a, which in this example is a conventional Mil-Std-1553 remote terminal. It will be appreciated immediately that the system 10 may be used to interface any two or more conventional, non-secure host systems operating with virtually any non-secure communications protocol. Other exemplary non-secure communications protocols could include, without limitation, Link 11, Link16, RS-232 and RS-485 communications protocols.

In this example the first host system 14 may be operating in a first security domain and the second host system 16 may be operating in a second security domain, and where the first security domain is higher than the second security domain. More specifically, in this example the first host system 14 is operating in a top secret security domain while the second host system 16 is operating in an unclassified security domain. For convenience, the host systems 14 and 16 will be referred to simply as "first host 14" and "second host 16".

The first host 14 may be in communication with the Data Guard 12 by a bus 18 that forms a top secret interface. The second host 16, however, may be in communication with the Data Guard 12 via a bus 20 that forms an unclassified interface. The Data Guard 12 in this example may include components that have been demonstrated or certified to be in compliance with predetermined security standards, but which now help to form the new system 10. The system 10, as will be explained in greater detail in the following paragraphs, is able accommodate information exchange between conventional (i.e., legacy) systems operating in different security domains and with well known communication protocols, which otherwise have no provision for secure information exchange, and which are therefore not suitable for many private and governmental applications requiring a high level of security. One dataguard suitable for use to help form the system 10 is the Boeing Secure Network Server, operated by the The Boeing Company, the assignee of the present disclosure.

The Data Guard 12 in this example is interfaced to the first host 14 via the bus 18 and a first, conventional legacy driver 22 component, which may form a PCI (Peripheral Component Interconnect) card, used in the Data Guard 12. Similarly, the second host 16 may be interfaced via the unclassified bus 20 and a second, legacy component 24 (e.g., PCI card) used in the Data Guard 12. For convenience, the first and second legacy components will be referred to throughout the following discussion simply as "first driver" 22 and "second driver" 24. In this example the first driver 22 may be viewed as a remote terminal and the second driver 24 as a bus controller.

The Data Guard 12 further includes a proxy A task group 26 (or "first proxy task group") interposed between the first driver 22 and a filter group 28 (hereinafter simply "filter" 28). The filter 28 is used for filtering received information packets. A proxy B task group 30 (or "second proxy task group") is interposed between the filter 28 and the second driver 24. The proxy A task group will be referred to hereinafter simply as "proxy A" 26, and represents conventional protocol software that functions to execute the communications between the filter 28 and the first driver 22. Similarly the proxy B task group 30 will be referred to throughout the following discussion simply as the "proxy B" 30. The proxy B 30 similarly represents conventional protocol software that handles the communications between the filter 28 and the second driver 24. As will be explained in greater detail in the following paragraphs, during operation of system 10 the filter 28 binds to proxy A 26 to receive the data to be filtered from first host 14 via first driver 22 and to proxy B 30 to complete the transfer of the filtered data to second host 16 via second driver 24. By "bind" it is meant that the filter is configured to communicate with each of proxy A 26 and proxy B 30.

Figure 2:
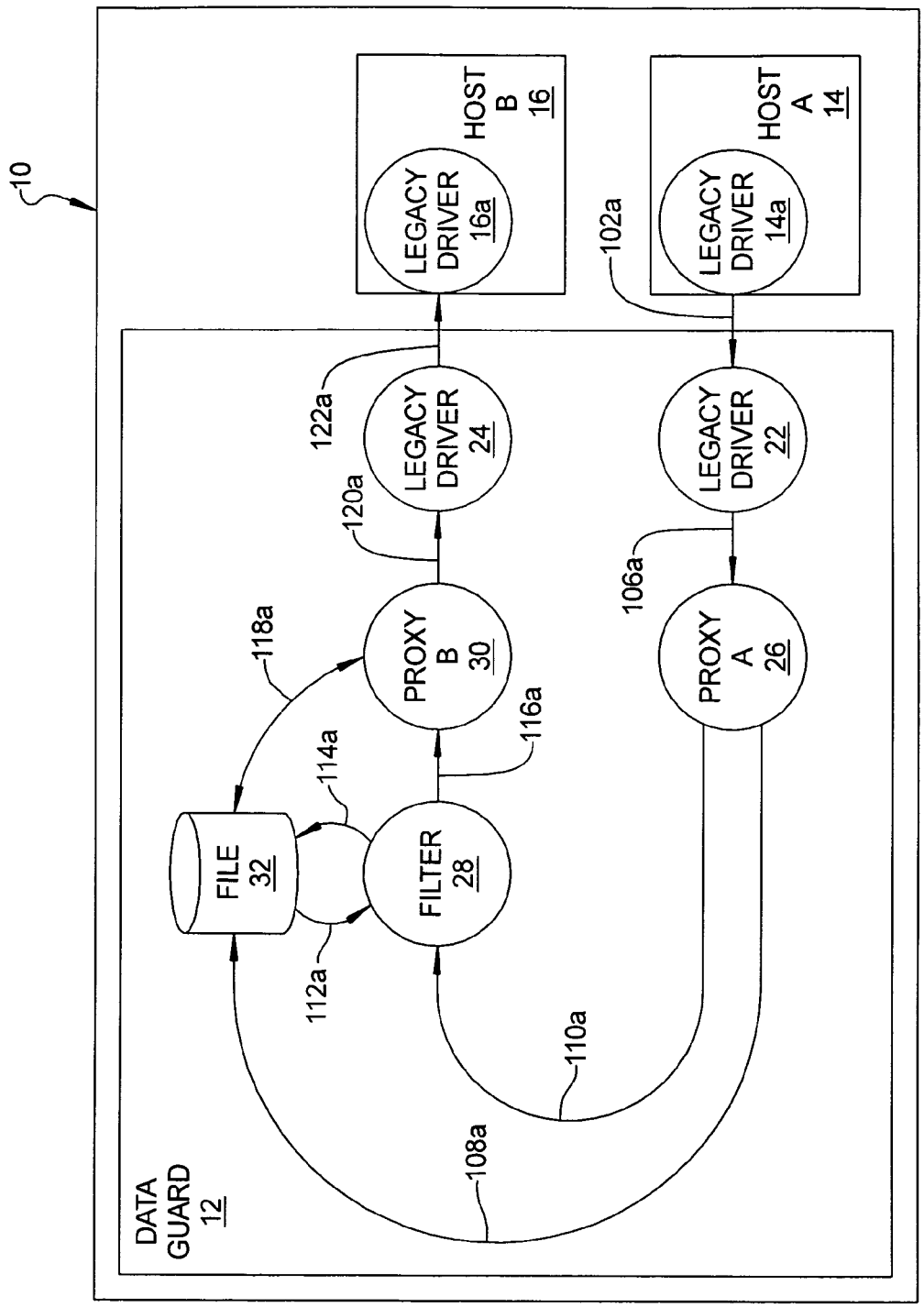
FIG. 2 is a logic flow diagram setting forth operations that may be performed by the system of FIG. 1 in communicating information from a higher security level domain to a lower level security domain.
Figure 3:
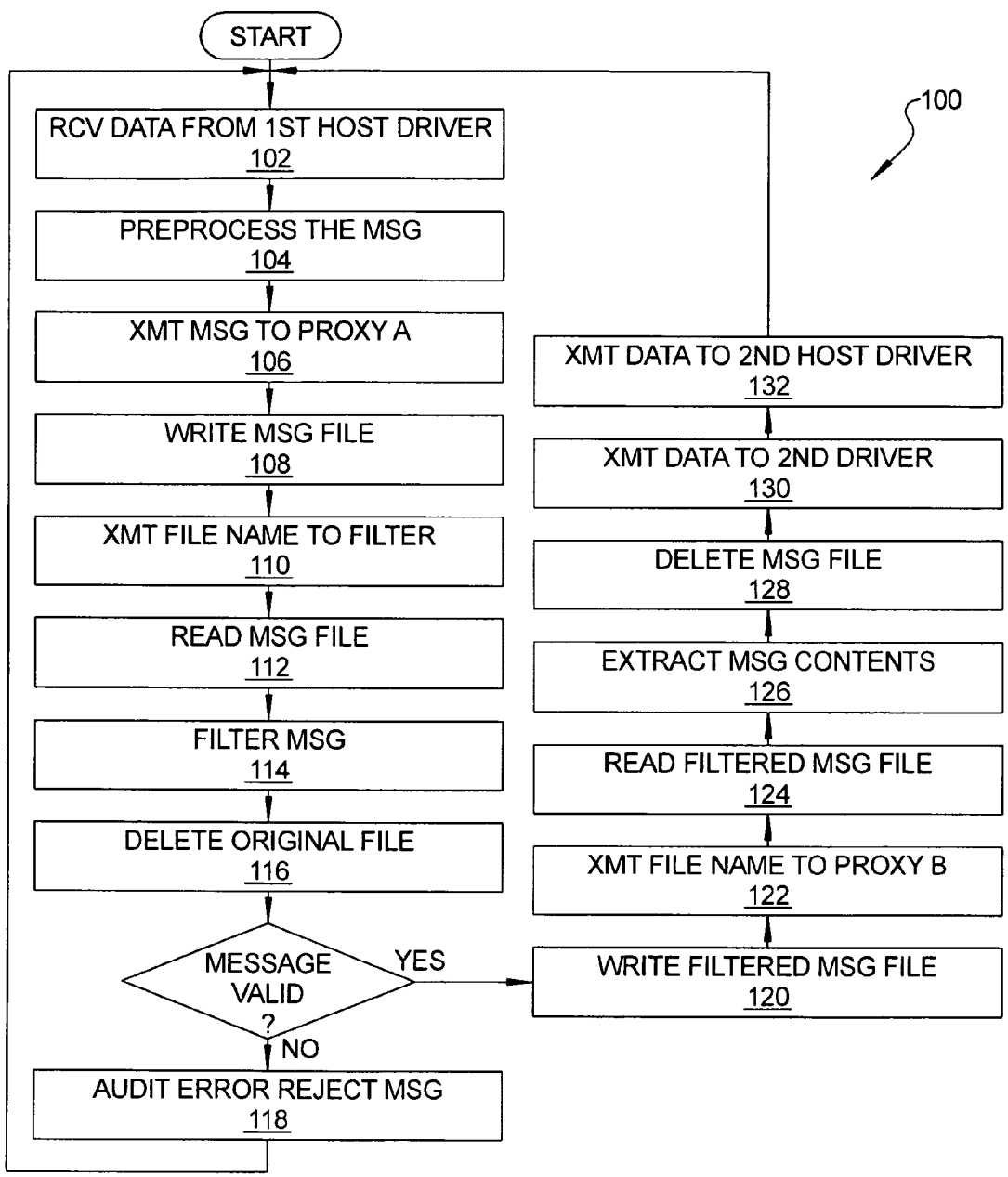
FIG. 3 is a flowchart that further illustrates the operations being performed in the logic diagram of FIG. 2.

Referring now to FIG. 2, and also to the flow diagram 100 of FIG. 3, various operations are shown that may be performed in implementing system 10 of FIG. 1 to effect a high-to-low security level exchange of information (i.e., information packets) from the first host 14 to the second host 16 (i.e., a data downgrade). The first driver 14a of the first host 14 may initiate the connection with the Data Guard 12 and preferably specifies the connection sensitivity level, which in this example is a top secret sensitivity. The outboard interface, in this example unclassified bus 20, preferably is designated by a system administrator in advance as a "downgrade" interface, meaning that it is at a lower security level than the inbound interface bus 18. The inbound interface bus 18 may also be thought of as an "upgrade" interface bus. The system administrator also preferably specifies in advance that there will be a filter task group (i.e., filter 28) for the outboard interface, as well as specifies support files to be used by filter 28 during the information exchange between the two hosts 14 and 16.

The first host 14 (i.e., the source host) begins transmitting data over the top secret bus 18 to the Data Guard 12, as indicated by line 102a. The first driver 22 executes the legacy communication protocol with the first host 14 to complete the data transfer from the first host 14 to the Data Guard 12. In this example the first driver 22 acts as a remote terminal and executes the Mil-Std-1553 protocol with the first driver 14a acting as a bus controller. The first driver 22 pre-process the data, putting it into a format usable by the Data Guard 12 and then transmits the message to the proxy A 26, as indicated by line 106a. Once the message transfer to proxy A 26 is complete, the proxy A 26 writes it to the file system 32, as indicated by line 108a, and forwards the message file name to the filter 28, as indicated by line 110a.

Upon receipt of the message file name from proxy A 26, the filter 28 reads the message from the file system 32, as indicated by line 112a, and performs its specified filter operations (operation 114). The filter 28 then deletes the originally received message (operation 116). If the filter 28 determines that the message is bad (i.e. it does not satisfy the filtering requirements) then the fault is audited, the message discarded and control is passed back to the beginning. Otherwise the filter 28 writes a new, filtered message back to the file system 32, as indicated by line 114a (operation 120). Once the new filtered message is written back to the file system 32, the filter 28 forwards the new, filtered message file name to the proxy B 30, as indicated by line 116a (operation 122). The proxy B 30 reads the new, filtered message file, indicated by line 118a (operation 124) and then extracts its contents (operation 126). It then deletes the message file (operation 128) and then transmits the contents to the second driver 24, which, in this example, has been preconfigured to act as a bus controller, as indicated by line 120a (operation 130). The second driver 24 executes the legacy (i.e., Mil-Std-1553) communication protocol with the second (i.e., destination) host 16 driver 16a (i.e. remote terminal) and completes the transfer of the message contents to the second host 16 using the security level of the second host 16, indicated by line 122a, which in this example is an unclassified security level (operation 132).

The above described operation provides several important advantages. For one, standard legacy drivers are relatively inexpensive and easily implemented within the Data Guard 12. The Data Guard 12 ensures that the two hosts 14 and 16 do not share memory and do not communicate directly with one another. The use of the proxy A 26 and proxy B 30 provide trusted gates that enable controlled communication between the hosts 14, 16 and that hide access to send and receive functions. In this way the first host 14, its users, processes and data are effectively isolated from the second host 16 and its users and processes.

Figure 4:
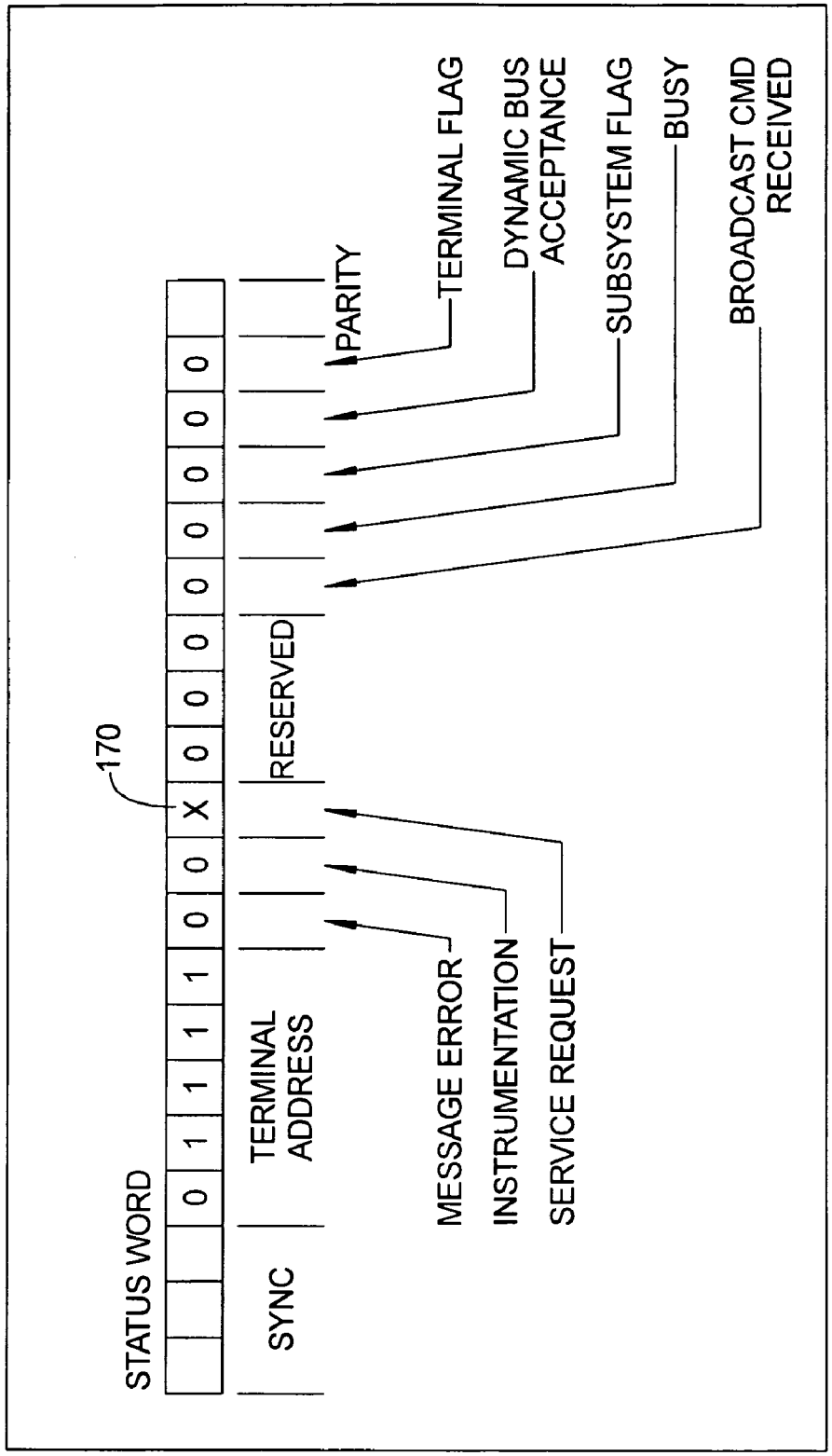
FIG. 4 is a diagram of a legacy Mil-Std-1553 status word illustrating the use of its Service Request bit by the system of FIG. 1.
Figure 5:
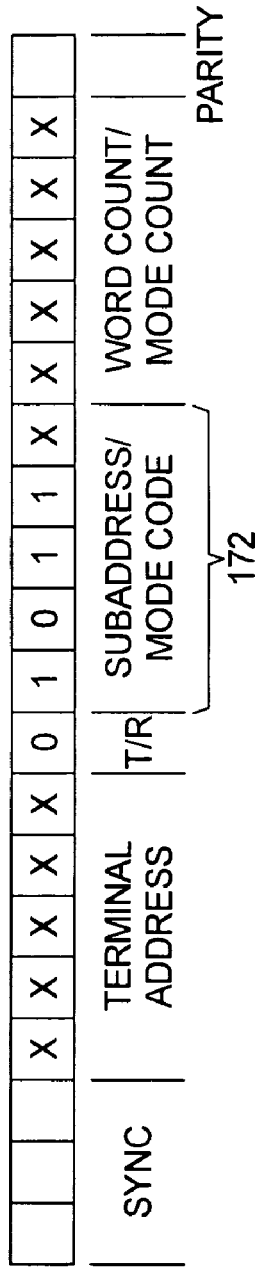
FIG. 5 is a diagram of a legacy Mil-Std-1553 command word illustrating the bit slots used to create "Transmit Message" and "Message Receive" command words for the system of FIG. 1.

Sending a message from a lower security domain to a higher one is virtually the same as that described above, except for the interactions between the Data Guard 12 and either host 14 or 16. Up to now the only message flowing from a lower security domain to the higher has been a status word (i.e. ack, nack) type message. For example, upon receipt of a message from the Data Guard's 12 second driver 24, the second host driver 16a always replies with a status word (i.e. ack, nack) message. What would be helpful is a means for the low side host to initiate the message flow process in the reverse direction. By using the status word message, it is possible for a low side (i.e., lower security level) component to indicate to a higher side (i.e., higher security level) component that it has a message available to send to it. Using the Mil-Std-1553 communications protocol as an example, it is possible for the second host 16 to indicate to the Data Guard 12 that it has a message available to be sent to the first host 14, in the higher security domain, by setting the Service Request bit in the status word message mentioned earlier, which is denoted by reference number 170 in FIG. 4. All that is required now to complete the low-to-high message transfer is for the higher side component (e.g. Data Guard 12) to inform the low side component (e.g. the second host 16) that it is ready to receive the message, and for the low side component (e.g. second host 16) to send the message to the high side component (e.g. Data Guard 12), and for the high side component (e.g. Data Guard 12) to acknowledge receipt of the message to the low side component (e.g. second host 16), which the low side component would reply to with the status word discussed previously. Once again, using the Mil-Std-1553 protocol as an example, it would be helpful to create two new Mil-Std-1553 control codes. These codes may be transmitted within the "Subaddress/Mode Code" bit slots denoted by reference number 172 in FIG. 5. With reference to FIG. 5, the bit construction of a Mil-std-1553 protocol message is shown. A message "11000" (Xmt Message) may be created to indicate that the second driver 24 (i.e., configured as a bus controller) is ready to receive the message. A command of "11001" (Message Received) may be defined to indicate that the second driver 24 has received the message returning the secondary host driver to its normal state.

Figure 6:
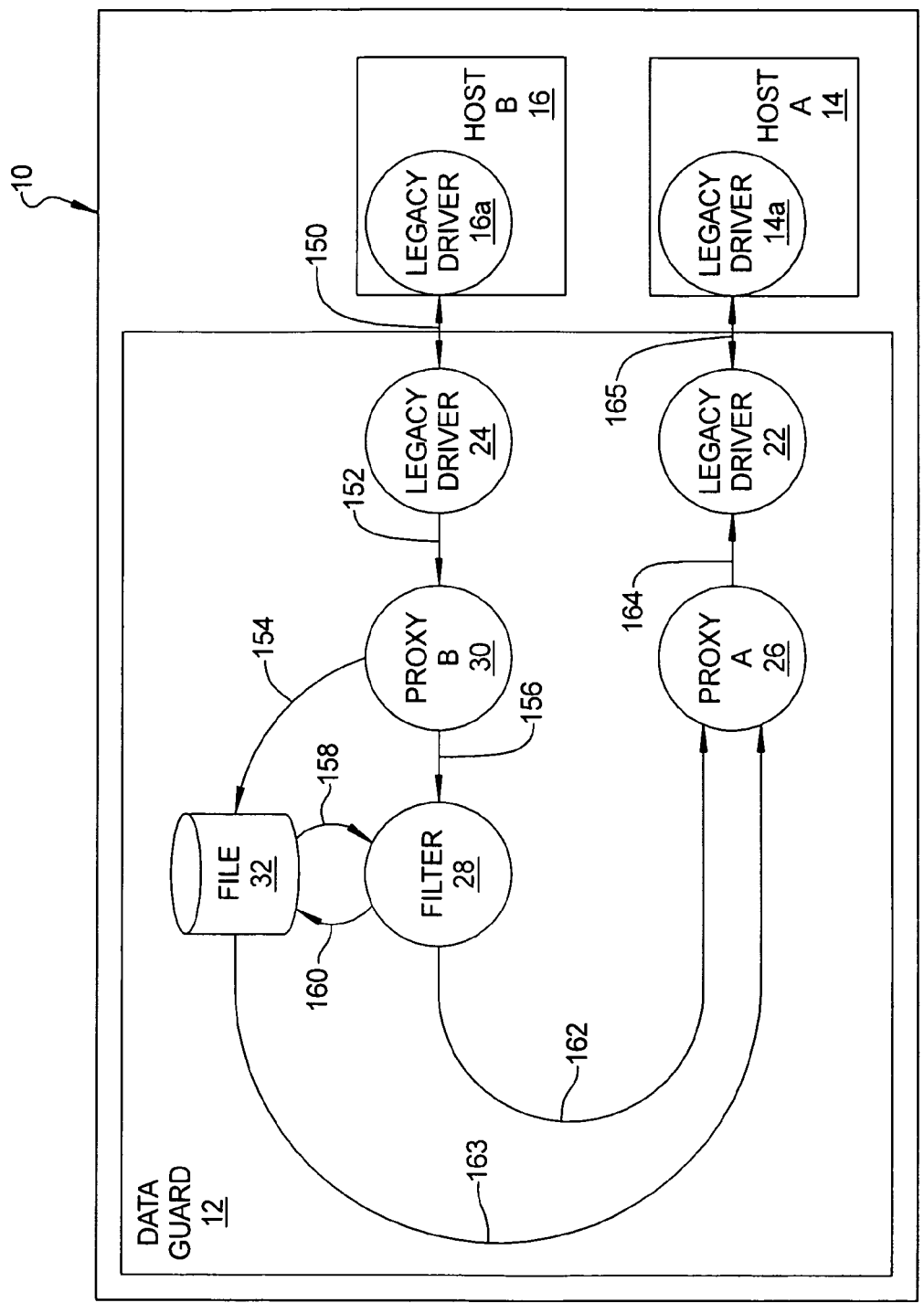
FIG. 6 is a logic flow diagram setting forth operations that may be performed by the system of FIG. 1 in transferring information from a lower level security domain to higher level security domain.
Figure 7:
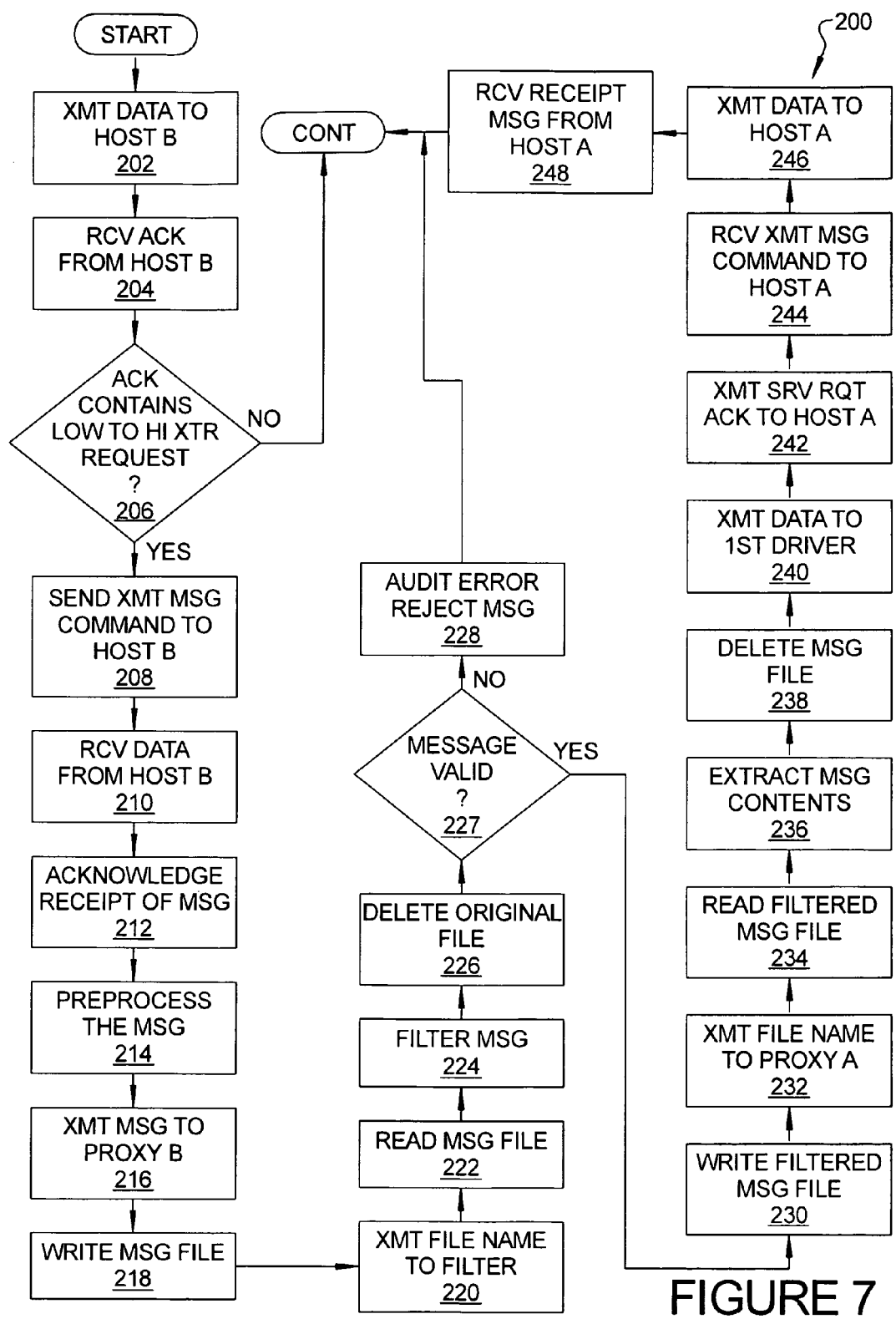
FIG. 7 is a flowchart that further illustrates the operations occurring in the logic flow diagram of FIG. 6.

Referring now to FIG. 6 and to the flow diagram 200 of FIG. 7, an example of communication from the low level security host 16 to the high security level host 14 will be described. In this example filtering is optional but will be included in the discussion to provide the reader with a description of how the filter 28 may be implemented in a low-to-high security level communication method in accordance with the present disclosure. The outbound interface (i.e., first driver 22) should be designated by the security administrator as an upgrade interface (i.e., an interface having a higher security level than the inbound interface), and is preconfigured to act as a remote terminal. The security administrator must also define which hosts are allowed to communicate with each other. In this example that definition would include second host 16 being allowed to communicate with first host 14. The security administrator should also specify the support files that are to be used by the filter 28, assuming a filter is being used. In this example data is initially provide to the second host 16 (operation 202). Also, in this example the low level security host, second host 16, should initiate the connection by using the status word in response to a message from second driver 24 as discussed above indicated by line 150 (operation 204). The Data Guard 12 can choose to participate in the low-to-high message transfer process with the second host 16 or not (operation 206). To receive the message from the second host 16, the Data Guard 12 must inform the second host 16 that it is ready to receive the message indicated by line 150 (operation 208). Using Mil-Std-1553 as an example, this could be done by the second driver 24 sending the Transmit Message command discussed above (reference FIG. 5). The second driver 24 then receives the messages from the second host driver 16a (operation 210). The second driver 24 acknowledges receipt of the message to the second host 16 as discussed above (operation 212) and preprocesses the message (operation 214). The connection from the low level security second host 16 to the proxy B 30 via the second driver 24 and the second host driver 16a operates at the source specified security level. However, the connection from the proxy A 26 to the first (i.e., destination) host 14 via the first driver 22 operates at the destination host's 14 security level.

The second driver 24 transmits the message to the proxy B 30, as indicated by line 152 (operation 216). When the message transfer is complete, the proxy B 30 writes it to the file system 32, as indicated by line 154 (operation 218), and then forwards the file name to the filter 28, as indicated by line 156 (operation 220). Using the file name received from proxy B 30, the filter 28 reads the message from the file system 32, as indicated by line 158 (operation 222), and performs the filtering operations (operation 224) that have been previously specified by the system administrator. This involves deleting the initially received message (operation 226). If at operation 227 the filter 28 determines that the message is invalid (i.e. it does not satisfy the filtering requirements) then the fault is audited, the message discarded and control is passed back to the beginning (operation 228), otherwise the filter saves the new, filtered message back to the file system 32 with a new file name, as indicated by line 160 (operation 230). Filter 28 then forwards the new, filtered message file name to the proxy A 26, as indicated by line 162 (operation 232). The proxy A 26 uses the new file name to obtain the newly saved (i.e., filtered) file from the file system 32, as indicated by line 163 (operation 234), it extracts the contents of the file (operation 236), deletes it (operation 238), and then forwards the extracted file contents to the first driver 22, as indicated by line 164 (operation 240). The first driver 22 responds to the next message that it receives from the first host 14 with a status word reply message indicating that it has a message for it (line 165, operation 242) and waits for the first host 14 to send a Transmit Message command (operation 244). The first driver 22 then forwards the message to the first host 14 (operation 246) and waits for the Message Received command from the first host 14 to complete the transaction. Thus, in this regard it will be appreciated that the first driver 22 to first host 14 data transfer is similar to the second driver 24 to second host 16 data transaction described earlier.

The system 10 and methodology of the present disclosure thus provides a high assurance means for legacy communication system users and devices operating in one security domain to seamlessly and in real time share information with legacy communication system users and devices operating in another (i.e., different) security domain. It includes a configurable filtering capability so that each command and data word can be inspected prior to being passed from one security domain to the other. Advantageously, the system can easily be implemented with commercially available off-the-shelf components in a variety of dataguard systems.

While various embodiments have been described, those skilled in the art will recognize modifications or variations which might be made without departing from the present disclosure. The examples illustrate the various embodiments and are not intended to limit the present disclosure. Therefore, the description and claims should be interpreted liberally with only such limitation as is necessary in view of the pertinent prior art.

What is claimed is:

1. A method for communicating information packets from a first host system operating in a first security domain and in accordance with a first protocol, using a dataguard, to a second host system operating in a second security domain different than said first security domain, and where said second host system is also operating in accordance with a second protocol, the method comprising:
  using a first driver operating with said dataguard to interface said dataguard with said first host system;
  using a first proxy task group operating with said dataguard to interface said dataguard to said first driver and to communicate with said first driver in accordance with the first protocol of said first security domain;
  using a second driver operating with said dataguard to interface said dataguard to said second host system; and
  using a second proxy task group operating with said dataguard to interface said dataguard to said second proxy task group and to communicate with said second driver in accordance with the second protocol of said second security domain; and
  wherein the dataguard further operates to:
    use a file storage system to directly receive and store said information packets from at least the first proxy task group;
    use a filter of the dataguard to obtain and filter the information packets from the file storage system, to write a new filtered message back to the file storage system with a new file name, and to notify the second proxy task group of the new file name;
    cause the second proxy task group to use the new file name to retrieve the new filtered message from the file storage system;
  deleting said information packets from said file storage system after said filter has written said new filtered message to said file storage system; and
  wherein said using a filter of the dataguard includes using the dataguard to create a filter in accordance with a previously defined support file.

2. A method for communicating information packets from a first host system operating in a first security domain and in accordance with a non-secure communications protocol, using a dataguard, to a second host system operating in a second security domain different than said first security domain, and where said second host system is also operating in accordance with said non-secure communications protocol, the method comprising:
  transferring an information packet from the first host system to a first proxy task group of the dataguard using a first driver interfaced to the first proxy task group, where said first driver operates in accordance with said non-secure communications protocol;
  using the dataguard to create a filter that binds to said first proxy task group to receive and filter all subsequently received information packets from said first host system, to generate filtered information packets;
  binding the filter to a second proxy task group, with the second proxy task group being interfaced to a second driver that operates in said non-secure communications protocol;
  using the second proxy task group to communicate said filtered information packets to said second host via said second driver; and
  wherein the dataguard further operates to:
    use a file storage system to directly receive and store said filtered information packets from the filter together with a new file name supplied by the filter;

use the filter to send to notify the second proxy task group of the new file name;

cause the second proxy task group to use the new file name to retrieve the filtered information packets from the file storage system;

deleting said information packets from said file storage system after said filter has written said new filtered message to said file storage system; and wherein said using the dataguard to create a filter includes using the dataguard to create a filter in accordance with a previously defined support file.

3. The method of claim 2, further comprising using the first proxy task group to transmit a name of the information packet to the filter.

4. The method of claim 2, further comprising using the filter to delete the initially received information packet after writing the filtered information packet to the file system.

5. The method of claim 4, wherein upon obtaining said new file name, said second proxy task group accesses said file system to obtain said filtered information packet and subsequently forwards said filtered information packet to said second driver, and wherein said second driver communicates said filtered information packet to said second host system.

6. The method of claim 2, wherein the filter further audits the information packet received from the first proxy task group to determine if its contents comply with predefined requirements of the filter.

7. A method for communicating information packets from a first host system operating in a first security domain and in accordance with a non-secure communications protocol, using a dataguard, to a second host system operating in a second security domain different than said first security domain, and where said second host system is also operating in accordance with said non-secure communications protocol, the method comprising:

transferring an information packet from the first host system to a first proxy task group of the dataguard using a first driver operating in said first security domain, and in accordance with said non-secure communications protocol;

using the first proxy task group to assign a name to said information packet when said information packet is received by said dataguard, to store the received information packet in a file, and to use a file name associated with the received information packet to identify all further received information packets having said file name;

creating a filter for the file name, the filter operating to filter information contained in information packets subsequently transmitted from said first host system that have a name that matches said filter name created by said filter;

binding the filter with the first proxy task group and also with a second proxy task group of the dataguard, with the second proxy task group being associated with said second security domain, so that the filter receives all subsequently transmitted information packets from said first host system that have said file name, and is able to communicate with said second proxy task group;

using the filter to receive the stored information packet and to filter the stored information packet to create a filtered information packet in accordance said non-secure communications protocol;

using the filter to delete the stored information packet from the file system;

using the filter to transmit the filtered information packet to a file system;

using the filter to assign a new file name to the filtered information packet and to transmit the new file name to said second proxy task group and to said file system;

using the second proxy task group to obtain said filtered information packet from said file system using said new file name;

using the second proxy task group to communicate said filtered information packet to a second driver operating in accordance with said non-secure communications protocol associated with said second host system;

deleting said information packets from said file system after said filter has written said filtered information packet to said file system; and wherein said creating a filter includes using the dataguard to create a filter in accordance with a previously defined support file.

8. The method of claim 7, further comprising using said second driver to interface said second proxy task group with said second host system.

9. The method of claim 7, further comprising having said second proxy task group delete said filtered information packet after reading its contents.

10. The method of claim 9, further comprising using said filter to audit said information packet.

11. The method of claim 7, wherein said first and second drivers operate in accordance with one of:
 a Mil-std-1553 communications protocol;
 a Line 11 communications protocol;
 a Link 16 communications protocol;
 an RS-232 communications protocol; and
 an RS-485 communications protocol.

12. The method of claim 7, further comprising:
pre-configuring said dataguard such that an interface formed between said second proxy task group and said second host system by said second driver comprises one of a downgrade interface and an upgrade interface, and pre-configuring said dataguard such that an interface formed between said first proxy task group and said first driver comprises the other one of said downgrade interface and said upgrade interface;

wherein said downgrade interface facilitates communications from a higher level security domain to a lower level security domain; and wherein said upgrade interface facilities communications from a lower level security domain to a higher level security domain.

13. A system for communicating information packets from a first host system operating in a first security domain and in accordance with a non-secure communications protocol, to a second host system operating in a second security domain that is different from said first security domain, and where said second host system is in accordance with a non-secure communications protocol, the system comprising:

a dataguard implemented on a processor;

a first driver included to form a portion of the dataguard, and forming an interface between said dataguard and said first host system, said first driver configured to operate in accordance with said non-secure communications protocol;

a second driver forming an interface between said dataguard and said second host system, said second driver also configured to operate in accordance with said non-secure communications protocol;

said dataguard including proxy task groups that further assist in interfacing said first and second host systems to said dataguard; and said dataguard including:
  a filter that binds to said proxy task groups and is adapted to filter received information packets from said first host system having a given packet name, and to generate filtered information packets identified by corresponding new packet names, the filter further being configured to forward the filtered information packets to a file system of the dataguard, together with new packet names for said filtered information packets, and further to transmit said new packet names to said second driver via one of said proxy task groups for subsequent transmission to said second host system in accordance with said non-secure communications protocol;
  deleting said information packets from said file system after said filter has written said filtered information packets to said file system; and
  wherein said dataguard creates said filter in accordance with a previously defined support file.

* * * * *